United States Patent [19]

Sumi

[11] 4,414,536
[45] Nov. 8, 1983

[54] DATA COMPRESSING SYSTEM
[75] Inventor: Masahiko Sumi, Chigasaki, Japan
[73] Assignee: Tokyo Shibaura Denki Kabushiki Kaisha, Japan
[21] Appl. No.: 285,802
[22] Filed: Jul. 22, 1981
[30] Foreign Application Priority Data Jul. 25, 1980 [JP] Japan .............................. 55-102258
Apr. 8, 1981 [JP] Japan ................................ 56-52823

[51] Int. Cl.³ .......................................... H03K 13/00
[52] U.S. Cl. .............................. 340/347 DD; 375/30
[58] Field of Search ................. 340/347 DD; 235/310, 235/311; 364/200, 900; 179/15.55 R, 15.55 T; 358/138

[56] References Cited

U.S. PATENT DOCUMENTS

| | | | |
|---|---|---|---|
| 3,603,976 | 9/1971 | Paine | 340/347 DD |
| 3,716,851 | 2/1973 | Neumann | 340/347 DD |
| 3,725,592 | 4/1973 | Tanaka | 358/138 |
| 3,838,415 | 9/1974 | Melvin | 340/347 DD |
| 3,925,611 | 12/1975 | Dennis | 340/347 DD |
| 4,077,034 | 2/1978 | Dell | 340/347 DD |

Primary Examiner—C. D. Miller
Attorney, Agent, or Firm—Finnegan, Henderson, Farabow, Garrett & Dunner

[57] ABSTRACT

In a data compressing system, a sampling circuit samples an audio signal from a signal generator at a given period, and an A/D converter converts the sampled data into corresponding digital data. A differential circuit differentiates the digital sampled data to produce differential sampled data. The differential sampled data is segmented into sampling data trains each including the number of the sampled data corresponding to the audio signal for one second. The sampled data trains for 100 seconds are added by an adder in a manner that the sampled data in each of the sampled data trains are arranged in a random fashion. The data train formed by the addition is used, as compressed data, for communication or reproduction of signals.

11 Claims, 7 Drawing Figures

UNIT TIME

DATA COMPRESSING SYSTEM

BACKGROUND OF THE INVENTION

The present invention relates to a data compressing system and more particularly a data compressing system for compressing data with a high correlation between adjacent sampling points, such as audio signals or video signals.

In recording, reproducing or transmitting an audio signal sampled and digitized, the audio signal is sampled at a sampling period of 8 kHz and the sampled audio data is then quantitized with an accuracy of 8 bits. In order to quantitize the audio signal, a data processor is, therefore, required which is able to process the data of 64K bit per second. The processor for processing a large amount of data is necessarily of the large-sized type. Many data compressions for reducing the data amount per second have been proposed with an intention of saving a capacity of a recording device or narrowing a frequency band-width in a communication line. A PARCOR system, for example, has attracted attention, in which characteristic parameters are extracted from an audio signal through a predetermined information processing scheme and those parameters extracted are composed to produce composed parameter data and the composed parameter data is reproduced to the original information signal. According to the PARCOR system, the data can be remarkably compressed into 2 to 4K bit per second. In the PARCOR system, however, special signal processings are required for the extraction and composition of the characteristic parameters, resulting in a complicated recording and reproducing apparatus. Improvement of the clearness of the reproduced information makes the signal processing considerably complicated and requires a lot of signal processing tasks.

There is another data compressing system proposed, for example, a format composition system. This system, however, involves similar problems of the PARCOR system.

SUMMARY OF THE INVENTION

Accordingly, an object of the present invention is to provide a data compressing system which can compress data by simple signal processing and produce compressed data with satisfactory precision.

According to the present invention, a signal, which exhibits a high correlation between adjacent sampled signals, has a periodicity, and is selectively extractable against noise, is sampled at given periods and the sampled signals are randomly accumulated for a give amount of data of the signals, whereby data compression is realized. The compressed data is extracted for the given amount of the data in the same random sequence as that at the time of the random accumulation, whereby the original signal is reproduced.

DETAILED DESCRIPTION OF THE PREFERRED EMBODIMENTS

Figure 1:
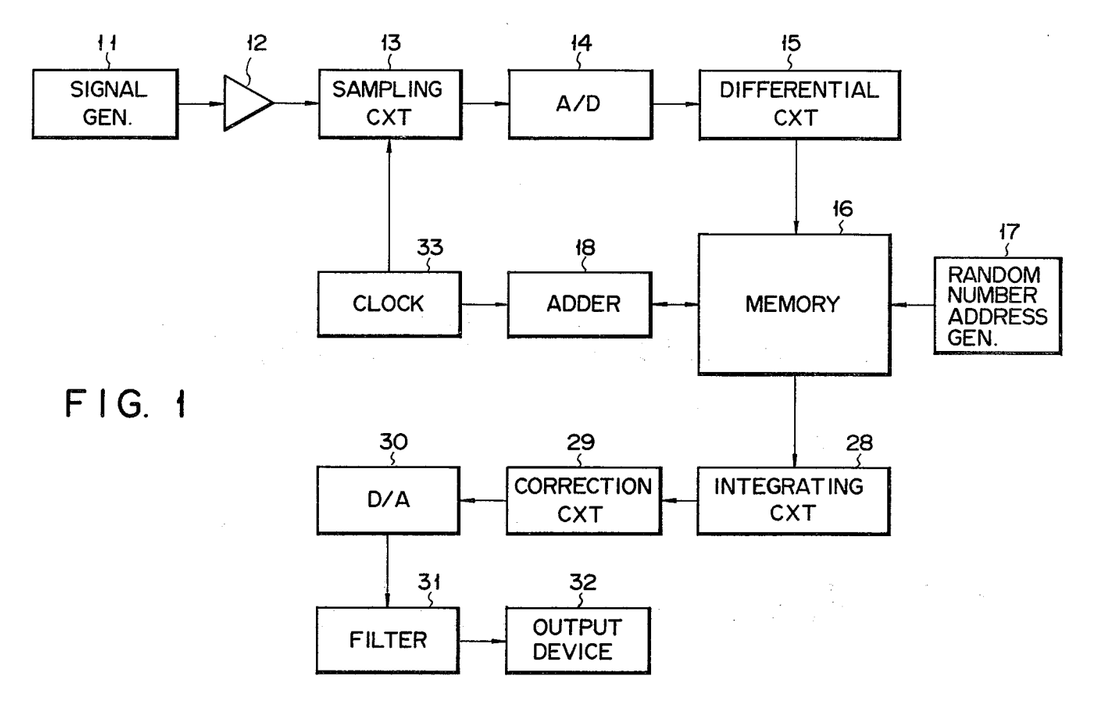
FIG. 1 shows a block diagram of a signal recording and reproducing apparatus using a data compressing system according to an embodiment of the present invention.

Referring now to FIG. 1, there is shown a signal recording and reproducing apparatus using a data compressing system of the present invention. In the system, an output terminal of a signal generator 11 for generating an audio signal or a video signal, such as a microphone or a video camera, is connected to an input terminal of a sampling circuit 13 via a buffer amplifier 12. An output terminal of the sampling circuit 13 is connected to an input terminal of a differential circuit 15 via an A/D converter 14. An output terminal of the differential circuit 15 is connected to a write input terminal of a memory 16 which is also connected for inputs from a random number address generator 17 and an adder 18. Further, a read terminal of the memory 16 is connected to an input terminal of an integrating circuit 28 comprised of an up-down counter and the like, for example. An output terminal of the integrating circuit 28 is connected with an input terminal of a correction circuit 29. An output terminal of the correction circuit 29 is connected to an output device 32 via a digital-to-analog converter 30 and a filter circuit 31.

In the circuit as mentioned above, when an audio signal as shown in FIG. 2, for example, is generated from the signal generator 11 (e.g. microphone), the audio signal is applied to the sampling circuit 13 through the buffer amplifier 12. The sampling circuit 13 samples the audio signal at periods of 100 kHz, for example, in synchrony with a signal of 100 kHz, for example, from a clock oscillator 33. Sampled signals X1, X2, X3, . . . are supplied to the A/D conveter 14 where those are converted into digital sampled data. In this case, the sampled signals X1, X2, X3, . . . are digitized with an accuracy of 10 bits, for example. The digital sampled data are applied to the differential circuit 15 to be differentiated digitally. In other words, the differential circuit 15 calculates differences in value between each adjacent digital sampled data.

Figure 2:
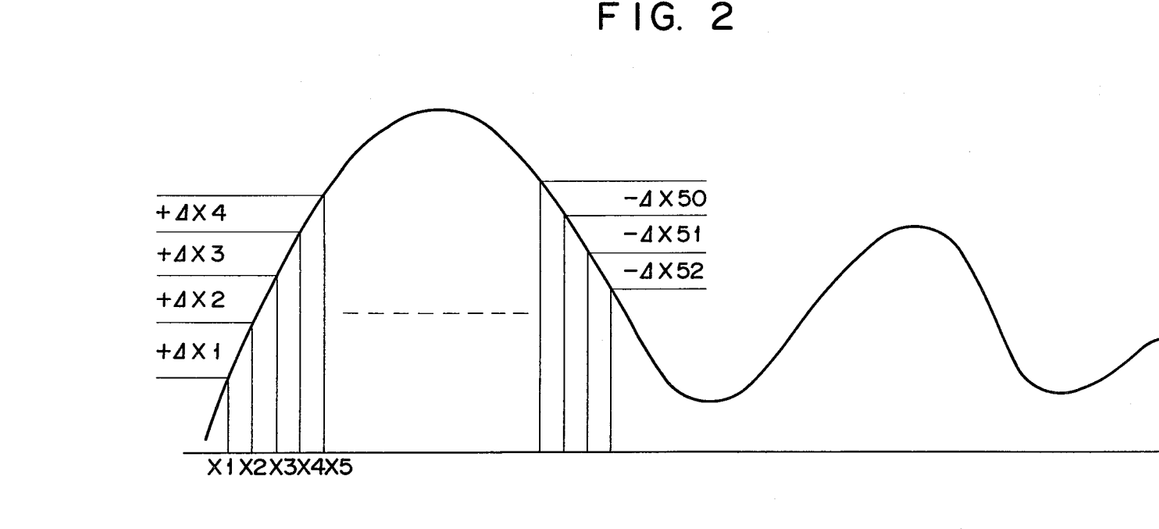
FIG. 2 is a waveform of an input signal.

In FIG. 2, the differences of the sampled signals, X1, X2, X3, . . . , i.e. $+\Delta X1$, $+\Delta X2$, $+\Delta X3$, . . . , are calculated. These differential data, $+\Delta X1$, $+\Delta X2$, $+\Delta X3$, . . . are digital values actually.

The differential data from the differential circuit 15 are transferred to the memory 16. The memory 16 is addressed by address data generated from the random number address generator 17. The differential data, $+\Delta X1$, $+\Delta X2$, . . . , are respectively stored in the designated addresses. As mentioned above, since the audio signal is sampled in synchronism with 100 kHz, $10^5$ sampled data are obtained per second. The differential data corresponding to these sampled data for one second are stored in the addresses of the memory 16, respectively.

At first, first differential data, A1, A2, A3, . . . , A$10^5$, for example, are sequentially stored in the addresses 1, 2, 3, . . . , 100000 (100K) of the memory 16, respectively. When differential data B1 to B$10^5$ corresponding to the sampled data for the succeeding one second are produced, the memory 16 is addressed by the address data from the random number address generator 17 in synchronism with the generation of the differential data B1 to B10$^5$. The addressing is performed in a sequential order different from that of the addressing for the differential data A1 to A10$^5$. The sequential order in this case has a randomness such as 6, 8, 4, 2, 9, 7, 5, 1, . . . The differential or difference data A6, A8, A4, A2, A9, A7, A5, A1, . . . stored in the addresses specified in the above sequential order are sequentially read out and transferred to the adder 18 where those are added to the difference data B1, B2, B3, . . . , B10$^5$, respectively, that is, (A6+B1), (A8+B2), (A4+B3), (A2+B4), (A9+B5), (A7+B6), (A5+B7), (A1+B8), . . . , are calculated. The added data S1, S2, S3, S4, S5, . . . are stored into the addresses into which the difference data A1, A2, . . . are first stored, respectively. In this way, the data S1 to S10$^5$ for one second are respectively stored into the addresses 1 to 100K of the memory 16.

Then, when difference data C1, C2, C3, . . . for the next one second are generated, an operation similar to the above one is performed. In this case, the addressing is carried out in a sequential order which is quite different from those for the first and second channel data A and B. The addressing is carried out in the order of, for example, 6, 3, 7, 4, 1, 8, 5, 2, 9, . . . The added data S6, S3, S7, S4, S1, S8, S5, S2, S9, . . . stored in the addresses specified in this order are sequentially read out and then are added to the difference data C1, C2, C3, C4, C5, C6, C7, C8, . . . in the adder 18, respectively. The updated data S1, S2, S3, S4, . . . are sequentially obtained from the adder 18 and are stored into the addresses 1, 2, 3, 4, . . . In this way, the difference data for 100 seconds are accumulated for one second and stored in the addresses 100K of the memory 16, as the accumulated data S1 to S10$^5$.

Figure 3:
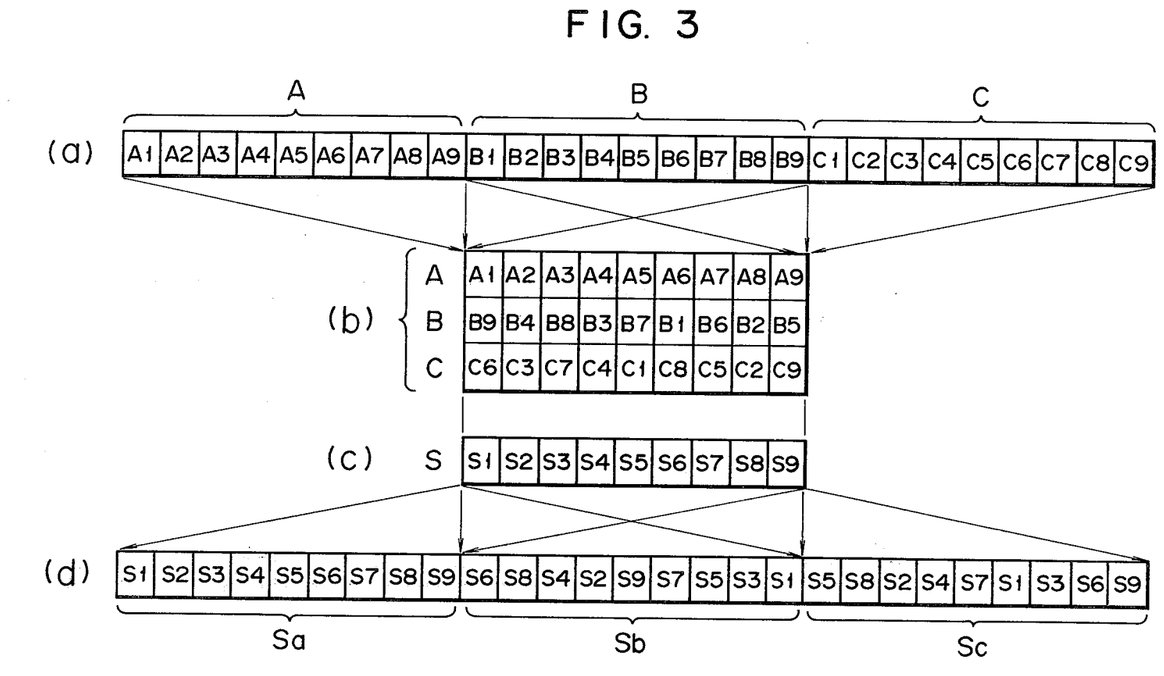
FIG. 3 illustrates data formats for explaining the data compression and the signal reproduction.

In brief, in FIG. 3, there is shown data formats of 3 channel data. One channel data is fact contains the difference data for one second; however, nine difference data are used for one channel for simplicity. The data A1 to A9 of the first channel are specified by the addresses 1 to 9. The data train of the second channel are specified by the addresses 1 to 9 so that those are arranged in the order of B9, B4, B8, B3, B7, B1, B6, B2. Similarly, the data train of the third channel are specified by the addresses 1 to 9 so that those are arranged in the order of C6, C3, C7, C4, C1, C8, C5, C2, C9. The data A1, B9 and C6 corresponding to one of the addresses, for example, the address 1, are accumulated as accumulated data S1. Similarly, the data corresponding to the remaining addresses 2 to 9 are accumulated as data S2 to S9.

The data S1 to S9 are expressed depending on whether the result of the accumulation A+B+C is a positive or negative value. When the accumulated result is a positive value or zero, the data S is expressed as "0", while when it is a negative value, the data S is expressed as "1". When the data S is expressed in this way, there is no case where the data value becomes extremely large due to the noise component as unnecessary data. For example, when the level of the sampled difference signal of an audio signal is 1 V at maximum and the signal levels of 100 channels are composed, the composed signal level may reach 100 V. If the accumulated data S is expressed "0" or "1" in accordance with the positive or negative value and "0" is set to 1 V, the composite signal of the 100-channel signals never exceeds 1 V. The voltage value assigned to the "0" or "1" of the data S may be selected according to a specification given and the composite level is independent of the number of the channels.

The data S1 to S10$^5$ thus obtained are the data formed by randomly arranging the 100-channel sampled data for each channel, and the 100-channel data is compressed to one-channel data. In other words, the sampled data for 100 seconds is compressed to the data for one second.

For reproducing the compressed data, the data S1 to S10$^5$ are read out, for each channel, from the memory 16 in the same random order as that of the data compression. In this case, the random number address generator 17 generates random address data in the same order of the data compression. The random number address generator 17 is comprised of, for example, a memory storing random address data of 100 channels which are read out in the same order for both a data compression mode and a data reproduction mode.

The data reproduction mode will be described in brief referring to FIG. 3. Firstly, the data S1 to S9 are sequentially read out from the addresses 1 to 9 of the memory 16 to form a data train Sa. Secondly, the data S1 to S9 are read out in the address designating order for the data compression of the two channel data. Accordingly, the data read out has an arrangement of S6, S8, S4, S2, S9, S7, S5, S3, S1 to form a data train Sb. In order to produce a data train Sc corresponding to the third channel data, the data S1 to S9 are similarly read out in the order of the addresses 5, 8, 2, 4, 7, 1, 3, 6, 9.

Each of the data trains thus obtained includes the data components of the other data trains. However, the data trains Sa, Sb and Sc have distinctive features of the channel data A, B and C before the data compression. For example, the data train Sa has a distinctive feature of the first channel data A while the data components of the data trains Sb and Sc contained in the data train Sa serve as mere white noise. Similarly, the data train Sb is distinctively featured by the second channel data B, while the data components of the data trains Sa and Sc serve as mere white noise. The same thing is true for the data train Sc.

The data trains thus read out Sa, Sb, Sc, . . . are sequentially transferred to the integrating circuit 28. The integrating circuit 28 integrates the data trains Sa, Sb, Sc, . . . to reproduce the original signal. Assume now that the data S1 to S9 of the data train Sa is 110011101, for example. In this case, the first two data S1 and S2, 1 1, drive an up-down counter making up the integrating circuit 28. The succeeding data S2 and S3, 1 0, holds the count-up value of the counter. 0 0 of the data S3 and S4 drive the counter to count down. Thus, when the values of two adjacent data are 1 1, the counter is counted up; when the values of two adjacent data are 0 1 or 1 0, the counter holds its contents; when the values of two adjacent data are 0 0, the counter is counted down. In this way, the data train Sa is reproduced into the digital signal corresponding to the sampled signals.

The output of the integrating circuit 28 is inputted into the correction circuit 29 for correction. The correction is made for the following reason. Actually, the data of 100 channels are compressed as mentioned above. In the reproduction mode, the reproduction data of each channel contains randomly the data of the remaining 99 channels, as a noise component. An error due to the noise component increases proportionally to the number of the data compressed channels to the one-half power. Therefore, the error may exceed the number of effective bits of the D/A converter in the course of the D/A conversion. To avoid this, when the outputt of the integrating circuit 28 is positive, the integrated output is multiplied by a predetermined number and the product is subtracted from the integrated output value. On the other hand, when the integrated output is negative, the product is added to the integrated output value.

The just-mentioned process is performed by the correction circuit 29, so that the output of the correction circuit 29 is always kept at approximately the zero level thereby to suppress the error component. The corrected digital signal from the correction circuit 29 is inputted into the D/A converter 30 where it is converted into an analog signal. The D/A converter 30 is constructed of 16 bits, for example; 10 bits are used for the analog conversion of actual audio data, while the remaining 6 bits are for allowing a drift due to the error. The analog reproduced signal from the D/A converter 30 is supplied to a filter 31 where high frequency components are removed from the reproduced signal. The reproduced signal derived from the filter circuit 31 is supplied to an output device 32 including a speaker and the like where it is reproduced in the form of sound.

As described above, according to the data compression system of the present invention, it is possible to compress the data of 100 seconds to one-second data. Further, the 100-second data can be expressed by $10^5$ bits. Therefore, the data transfer rate is 1K bit/sec and the amount of data per second can be considerably reduced. The algorithm for the data compression is extremely simple and the accuracy of the reproduced data is excellent.

The signal to noise ratio S/N resulting from the data compression system according to the present invention will be described. The table given below tabulates coincidence and noncoincidence of data A, B and C expressed in terms of "0" or "1" with the sum data S of those A, B and C.

TABLE

| A | B | C | S | A=S | B=S | C=S |
|---|---|---|---|-----|-----|-----|
| 0 | 0 | 0 | 0 | o | o | o |
|   |   | 1 | 0 | o | o | x |
|   | 1 | 0 | 0 | o | x | o |
|   | 1 | 1 | 1 | x | o | o |
| 1 | 0 | 0 | 0 | x | o | o |
|   |   | 1 | 1 | o | x | o |
|   | 1 | 0 | 1 | o | o | x |
|   | 1 | 1 | 1 | o | o | o |

If a probability that the data A coincides with the data S is 50%, the probability indicates the data S does not quite reflect the data A. When a probability that A=S is 100% or 0%, the data S well reflects the data A. The data S formed of the data A, B and C equally reflects the data A, B and C in the above table. A probability that A=S is accordingly given $$50\% + (100-50)/3\% = 66.7\%.$$

Actually, however, the probability is 75%, as seen from the table. The same thing is true for the data B and C. While the table lists the probabilities for three channel data, the probability of A=S for the data of 100 channels is obtained in accordance with a binomial theorem, $$50\% + \sqrt{100}/100\% = 55\%.$$

Therefore, a probability of A≠S is 45%. This probability is caused by the noise due to the random-arranged 99-channel data. Therefore, when the data S with a probability 50% to 100% is the signal component, the signal component in respect to the 100 channels is $1/\sqrt{100}$, or 0.1. If the frequency of the audio signal is 4 kHz, the signal component is represented by 25 sampling points of those of 100 kHz. An error caused by the 25-sampling data, or a random walk component, is $\sqrt{25}=5$ points. On the other hand, the signal component is 25 points ×0.1 or 2.5 points. Consequently, the S/N is 0.5. In actuality, however, a contribution ratio of the data signal of each channel to the data S is not equal, and is generally small compared to a desired channel. Therefore, the S/N is improved over the above value.

In general, an unvoiced period in a voice signal is relatively long, and the contribution ratio of the desired data to the data S is higher to this extent. The analysis of a waveform of an audio signal shows that a waveform amplitude at the initial part of each pitch is large and becomes gradually small. Therefore, the amount of the information in the later part in the pitch is small. It is considered, therefore, that the contribution ratio of the data to the data S is also small to such an extent. Additionally, a high intensive portion of the waveform of the audio signal has a high contribution ratio to the data S and a large S/N, so that the signal component of the high intensity is useful in recognizing the whole vocal sound.

When considering the nature of the audio signal, the S/N is not 0.5 but 1 or more, and this value suffices for the signal reproduction. While the above discussion relates to the audio signal component of 4 kHz, it is a low frequency on the order of 100 Hz that most effectively contributes to the determination of the vocal sound. In such a low frequency signal, the number of samplings is $10^3$, the random walk error is 32, while the signal component is $1/10 \times 10^3 = 100$. Accordingly, the signal reproduced is distinctive. Therefore, the audio signal can be recognized very clearly. That is, the low frequency component can be reproduced with a good S/N ratio. For the high frequencies, the S/N is unsatisfactory, but the appearance ratio and the contributing ratio of the signal component are high and therefore the amount of the signal component lost is not appreciable. As a consequence, the audio signal applied can effectively be reproduced.

Figure 4:
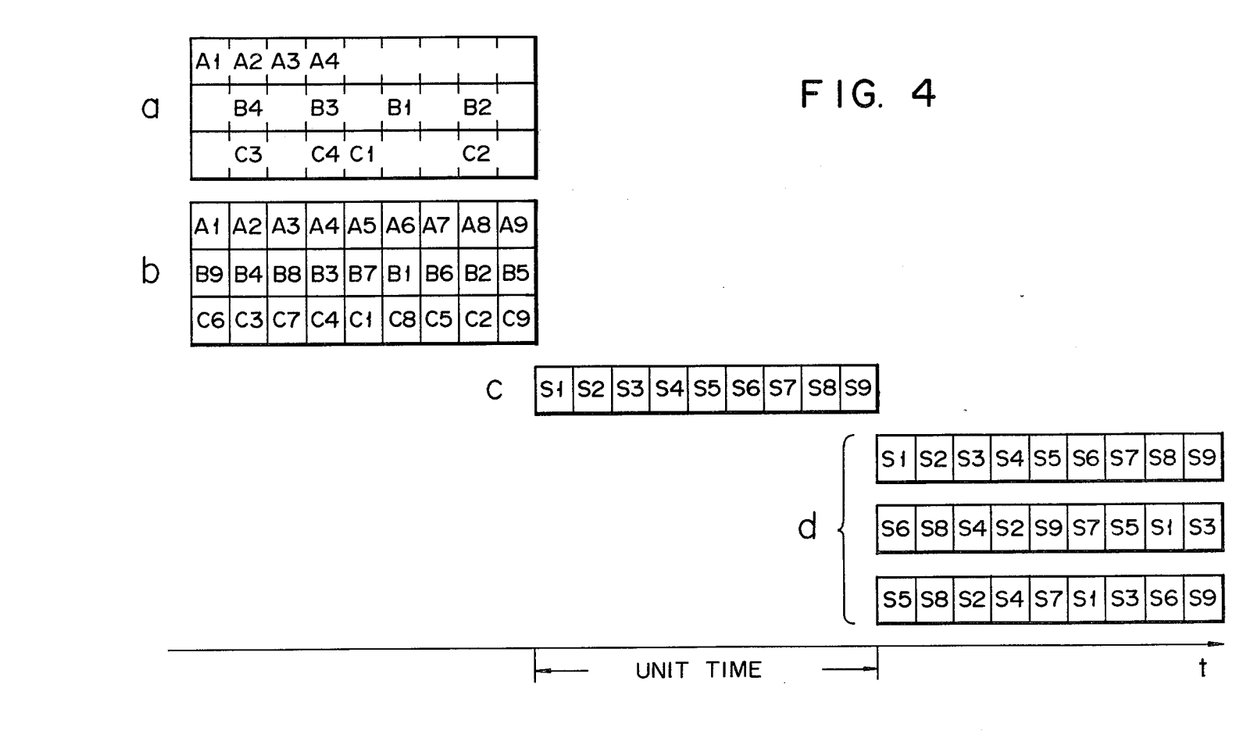
FIG. 4 illustrates data formats for explaining a method for compressing individual data.

While the above-mentioned embodiment compresses the continuous audio signal of 100 channels to one-channel signal, that is, the individual audio signals of 100 seconds is compressed into one-second data. The individual channel data shown in FIG. 4(a) are extracted for a unit time of 0.1 second, and the extracted data are arranged randomly, as shown in FIG. 4(b). The data trains A, B and C are subjected to the summing operation, so that the data shown in FIG. 4(c) is obtained. The data shown in FIG. 4(c) is transmitted or stored. The data S1 to S9 are read out in the order of a random number as in the case of FIG. 4(b) thereby forming data shown in FIG. 4(d). This method enables the data compression and reproduction on real time. The signal delay in this case is at most two unit times (0.2 second). Further, a large amount of data (of 100 channels) can be transmitted with small signals. The signal delay is small compared with a delay in the international telecommunication. Accordingly, it produces no problem in practical use. Since the unit time can further be reduced, the adverse effect by the signal delay is almost negligible.

In the above-mentioned embodiment, the sampled audio signal is data-compressed, but a frequency component formed by an audio signal frequency-separated may also be data-compressed. The numbers of data applied to the same address for the respective channels are not necessarily equal to each other but may be unequal and randomly arranged or queued randomly. Further, two bit or more as well as one bit of "0" or "1" may also be used for expressing the sum data S. The number of channels may be selected in accordance with a specification given. The A/D converted data can directly be subjected to the data compression process with the omission of the differentiating and integrating processes. This case does not apply only to the using of codes but directly applies the contents of the memory to the D/A converter. Any means may be adopted for the random address generation, if it can generate random addresses with high reproducibility.

Figure 5:
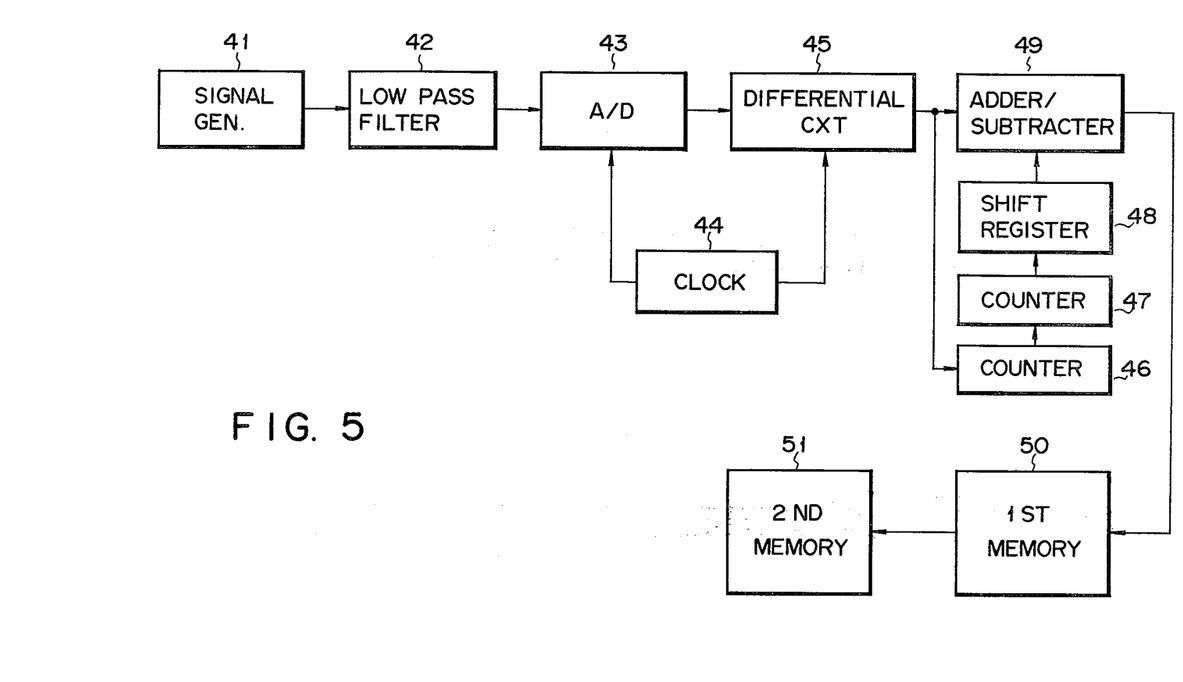
FIG. 5 is a block diagram for illustrating a data compressing system according to another embodiment of the present invention.

Another embodiment of a data compressing system according to the present invention will be described referring to FIG. 5. An audio signal from a signal generator such as a microphone is inputted into a low-pass filter 42 where the frequency components of 4 kHz or more are cut off from the audio signal. The audio signal, after passing through the filter 42, is inputted into an A/D converter 43 which in turn converts it into a digital signal. In this case, the audio signal is sampled in synchronism with a 32 kHz synchronizing signal and the sampled signal is converted into binary digital data of 8 bits. The 8-bit data is successively inputted into a differential circuit 45. The differential circuit 45 calculates the differences between every two adjacent sampled data in synchronism with a clock signal to provide the difference data. The differentiating process is not necessary, but emphasizes high frequencies of the audio signal, so that the coded signals are reproduced to improve an articulation of the reproduced signal.

Figure 6:
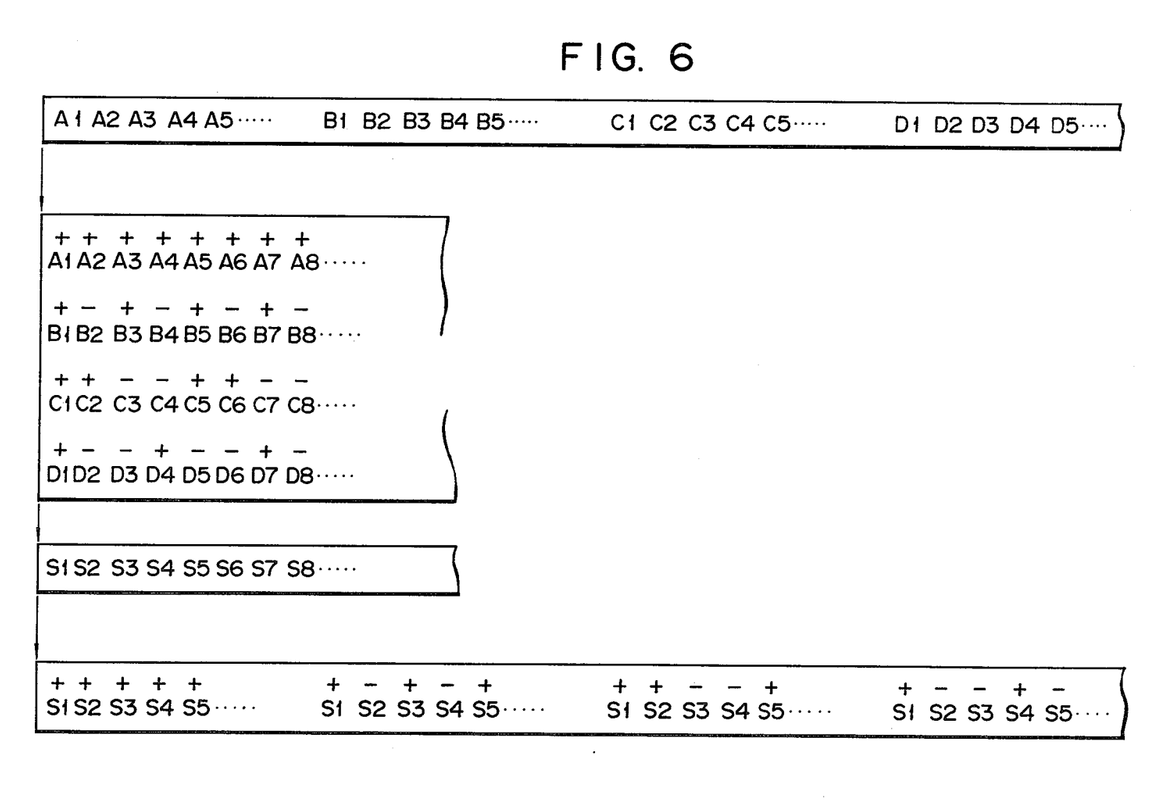
FIG. 6 illustrates data formats useful in explaining the data compressing system shown in FIG. 5.

The difference data from the differential circuit 45 is counted by a counter 46 and, when counting the difference data of 32,000, the counter 46 produces a carry signal. At this time, a data train A having the first 32,000 data A1 to A32,000 is formed. Similarly, other data trains B to D having difference data B1 to B32,000, C1 to C32,000, and D1 to D32,000 are segmented, respectively. The data trains A to D are illustrated in FIG. 6(a). The data trains A to D can be discriminated on the basis of count values of the carrier signals from the counter 46, i.e. count values 0, 1, 2 and 3 of the counter 47. A shift register 48 is so designed as to produce non-inverted (added) signals for all the differential signals in the data train A, when receiving the output data from the counter 47, e.g. the discriminating data 0. Accordingly, the non-inverted signals are applied for the differential data A1 to A32,000 of the data train A. Non-inverted and inverted (subtracted) signals are alternately and repeatedly applied to the differential data B1 to B32,000 of the data train B. The non-inverted signal, the non-inverted signal, the inverted signal, the inverted signal are repeatedly applied to the differential data C1 to C32,000 in the data train C. The non-inverted signal, the inverted signal, the inverted signal, the non-inverted signal are repeatedly applied to the differential data D1 to D32,000 in the data train D. In FIG. 6(b), a symbol "+" for the non-inverted signal and a symbol "−" for the inverted signal are attached to the differential data.

When, in the data trains, the differential data A1 to A32,000 of the data train A are applied to an adder/subtractor 49. The differential data are written as the addition data into a first memory 50. After the completion of the writing of the data train A, the data train B is inputted into the adder/subtracter 49. In accordance with the non-inverted and inverted signals applied, the differential data B1 to B32,000 are added to or subtracted from the differential data A1 to A32,000, respectively. The differential data of the data trains C and D are similarly added to or subtracted from the differential data stored in the first memory 50. The differential data at a sampling point i of each data train are subjected to the addition/subtraction operation in accordance with a rule of each data train;

$$Si = Ai \pm Bi \pm Ci \pm Di.$$

Through the operation, the sum data train S of the four data trains A, B, C and D are formed, as shown in FIG. 6. The sum data train S thus formed is loaded into a second memory 51. Thus, the second memory 51 stores the compressed data of the data trains A, B, C and D. Alternately, only the polarity signs of the sum data, or the sign of the non-inverted or inverted signals, may be extracted as the sum data train.

In this manner, the data for four seconds, or the four data trains, are together data-compressed and the data compressed are successively stored into the second memory 51.

For reproducing the sum data train compressed and stored in the second memory 51, the following process is carried out. In this case, the differential data of the sum data train S, or the sum of the differential data of the data trains A, B, C and D, may be expressed by 10 bits but 1 bit may be used for expressing only the polarity symbol of the sum. The compressed data, or the sum data train S, is reproduced into four data segments corresponding to the data trains A, B, C and D. For reproducing the data train A, the control data according to the rule used in the data compression mode, i.e. the non-inverted data and the inverted data, are used in exactly the same way, and the polarity symbols are applied to the differential data of the sum data train S, respectively. To be more specific, the differential data Si and the control data are exclusively ORed. For example, when the differential data Si is positive, if the symbol is "+", the data is reproduced as "0". Conversely, if the symbol is "−", the data is reproduced as "1". When the data Si is negative, "1" of the reproduced signal is used for the "+", while "0" is for the "−". The similar process is correspondingly applied for the reproductions of the data trains B, C and D in the sum data train S. In this way, the data (d) in FIG. 6 is reproduced.

As seen from the data arrangement shown in FIG. 6(b), when a data train selected is considered, if the data train is multiplied by the polarity symbols used in the inverting process, the elements (the differential data) in the desired data train are all positive, while the elements in each of the remaining data trains are periodically inverted in the polarity. The inversion of the polarity implies that those data lose their essential information and serve as mere noise. Therefore, the data train having the effective information is the desired data train, while the remaining data trains are ineffective. Therefore, if the sum data train is subjected to the inverting process, the information intensively reflecting the information contained in the data train can be obtained and therefore the data reproduction is realized.

In the actual data reproduction, if the data elements reproduced are averaged between the adjacent sampling points, the data may be produced with a high accuracy but at small noise level.

As described above, the present data compressing system actively makes use of the nature essential to the video signal or audio signal. That is, in the data compressing system, the data elements of the data trains which are low in the correlation are inverted in accordance with different rules thereby obtaining the sum of the data trains. Therefore, the data compression may be realized very simply and effectively. Further, for the data reproduction, the other data trains than the desired one are treated as noise, so that the reproduced data train intensively reflects the original information. Therefore, the effects attained by the present data compressing system are remarkable.

The rule for the inverting process used in the data compression may be expressed as a mere column of elements in an orthogonal matrix. The rule is given by an element Hij of the Hadamar's matrix, for example. Specifically, when n data trains are segmentally formed, the elements of the nth Hadamar's matrix are used and those are recirculatingly read out and used as control signals for the inverting processing. For example, in the case of an 8th degree Hadamar's matrix, the elements in each row of the Hadamar's matrix as given below are used as the inverting processing control data corresponding to the data train.

$$\begin{bmatrix} + & + & + & + & + & + & + & + \\ + & - & + & - & + & - & + & - \\ + & + & - & - & + & + & - & - \\ + & - & - & + & + & - & - & + \\ + & + & + & + & - & - & - & - \\ + & - & + & - & - & + & - & + \\ + & + & - & - & - & - & + & + \\ + & - & - & + & - & + & + & - \end{bmatrix}$$

In the case of a $2^{m+1}$th-degree Hadamar's matrix, when the Hadamar's matrix of $2^m$th degree is expressed by $h(2^m)$, the respective elements in the matrix given below are used for the control data.

$$[H(2^{m+1})] = \begin{bmatrix} H(2^m) & H(2^m) \\ H(2^m) & -H(2^m) \end{bmatrix}$$

As seen from the foregoing description, the data compression can be carried out only through the addition and subtraction processes. Further, when the data reproduced after the data is thus compressed, the reproduced data has a good reproduction of the original signal.

Let us consider a case where 11 bits are used for the sum data train. Basically, the audio signal exhibits a gentle variation in the waveform. Accordingly, the audio signal is divided into a slow varying portion (expressed by a Roman letter in the following equation) and a rapidly changing portion (expressed by a Greek letter)

$$A = a_1 + \alpha_1 \ (a_1 >> \alpha_1).$$

The reproduced elements are averaged between the adjacent sampling points and the averaged data A' is given $$A' = \tfrac{1}{4}(S1 + S2 + S3 + S4).$$

In the above equation, the sign of addition or subtraction is according to the given rule. The right side in the above equation is rewritten into $$\tfrac{1}{4}(S1 + S2 + S3 + S4)$$
$$= \tfrac{1}{4}(A1 + B1 + C1 + D1) + \tfrac{1}{4}(A2 - B2 + C2 - D2) +$$
$$\tfrac{1}{4}(A3 + B3 - C3 - D3) + \tfrac{1}{4}(A4 - B4 - C4 + D4)$$

$$= \tfrac{1}{4}(A1 + A2 + A3 + A4) + \tfrac{1}{4}(B1 - B2 + B3 - B4) +$$
$$\tfrac{1}{4}(C1 + C2 - C3 - C4) + \tfrac{1}{4}(D1 - D2 - D3 + D4)$$

$$= \tfrac{1}{4}(4a_1 + \alpha_1 + \alpha_2 + \alpha_3 + \alpha_4) + \tfrac{1}{4}(\beta_1 - \beta_2 + \beta_3 - \beta_4) +$$
$$\tfrac{1}{4}(\gamma_1 + \gamma_2 - \gamma_3 - \gamma_4) + \tfrac{1}{4}(\delta_1 - \delta_2 - \delta_3 + \delta_4)$$

$$= a_1 + \alpha_1 + (\text{error}).$$

Since the positive and negative terms of the error $\Delta$ are small and randomly arranged, the right side in the above equation is essentially expressed by $$A + (\text{error}) = A + \tfrac{1}{4}\sqrt{16.4}$$
$$= A + \Delta$$

Further, since $\Delta << A$, the error is almost negligible. Therefore, the reproduced data with high precision can be obtained.

A time required for the execution of the present data compression system for one sampled value is only the following three steps:
 (a) to read out the data from the memory device.
 (b) to execute the addition and subtraction.
 (c) to write the data into the memory.

A time for each step is generally 1 μsec and the period of the sampled value is 30 μs. Accordingly, the total time is sufficient for satisfactory real time processing. In this respect, the conventional PARCOR system requires multiplications and additions of several tens for 100 μsec, for example. When comparing the conventional one, the data compressing system can easily be constructed in the hardware and the degree of the data compression is extremely high.

Figure 7:
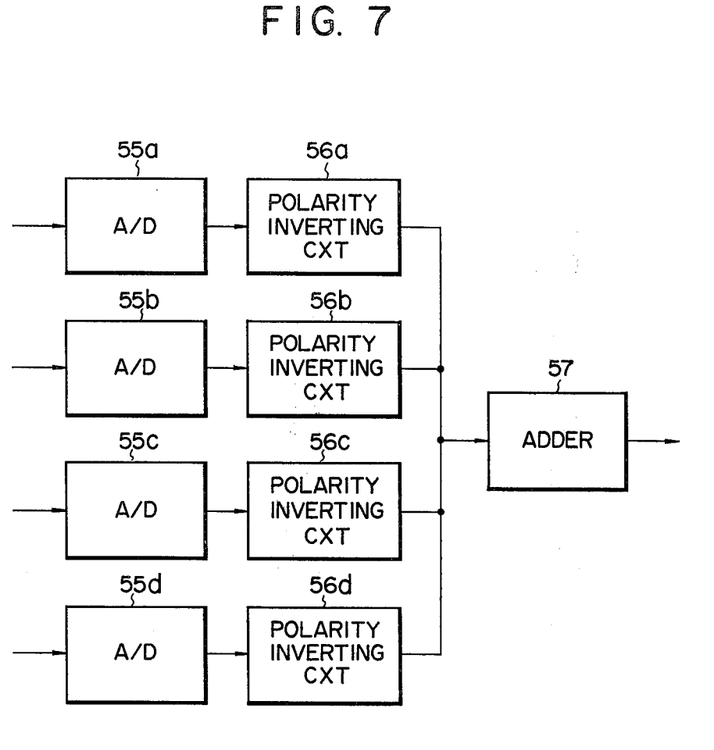
FIG. 7 is a block diagram of a data compressing system according to another embodiment.

It is evident that the present invention is not limited to the above-mentioned embodiments. While the embodiments use hardware exclusively for the data compression, the hardwares may be replaced by a software if a computer is used. Further, the storing of the data trains in the memory is not essential for the data compression. For example, in FIG. 7 four channel audio signals are applied to the data compression system and led to polarity inverting circuits 56a to 56d with different control rules through A/D converters 55a to 55d. Then, the output signals from the polarity inverting circuits 56a to 56d are applied to an adder 57 where the four channel signals are multiplexed. The inverting process is applicable not only for the polarity inversion but also for an amplitude modulation of a carrier wave. In this case, one sum data train S is assigned for one or a plurality of carrier waves. In this method, there is no need for providing guard frequency bands and a high degree of multiplexity can be realized. In the case of the video signal. The process is applicable to separate scanning lines, different frames, or quite different picture signals, for the purpose of the multiplexing.

What is claimed is:

1. A data compressing system comprising:
   sampling means for sampling an input signal at a given sampling period to produce a plurality of sampled data trains, each of said data trains containing a given number of sampled data elements;
   differential means connected to said sampling means for differentiating said sampled data elements to obtain a plurality of differential data trains, each of said differential data trains containing a given number of differential data elements;
   coding means connected to said differential means for applying code elements, each of the code elements including different weight codes, to the differential data elements of each of said differential data trains, said coding means including first counting means for counting said data elements of each of said differential data trains to generate carry data, second counting means for counting up in response to said carry data of said first counting means, and means for applying said weight codes corresponding to the contents of said counting means to said differential data trains; and
   summing means connected to said coding means for summing said differential data trains with said weight codes to obtain compressed data.

2. A data compressing system according to claim 1 wherein said sampling means comprises a clock generator for generating clock pulses with a frequency corresponding to said sampling period and input signal sampling means for sampling said input signal in synchronization with said clock pulses.

3. A data compressing system according to claim 1 further including means for storing said differential data trains.

4. A data compressing system according to claim 1 wherein said coding means include means for generating said weight codes having a combination of at least one of a positive polarity value and a negative polarity value.

5. A data compressing system according to claim 2 wherein said coding means include means for generating said weight codes having a combination of at least one of a positive polarity value and a negative polarity value.

6. A data compressing system according to claim 1 wherein said input signal is an audio signal.

7. A data compressing system according to claim 2 wherein said input signal is an audio signal.

8. A data compressing system according to claim 1 wherein said input signal is a video signal.

9. A data compressing system according to claim 2 wherein said input signal is a video signal.

10. A data compressing system according to claim 1 wherein said sampling means samples said input signal in synchronization with clock pulses having a frequency of 32 kHz.

11. A data compressing system according to claim 2 wherein said sampling means samples said input signal in synchronization with clock pulses having a frequency of 32 kHz.

* * * * *